US012421785B2

(12) United States Patent
Giorgi

(10) Patent No.: US 12,421,785 B2
(45) Date of Patent: Sep. 23, 2025

(54) CONTAINER CABINET

(71) Applicant: MOLTENI & C. S.P.A., Giussano (IT)

(72) Inventor: Luca Giorgi, Giussano (IT)

(73) Assignee: MOLTENI & C. S.P.A., Giussano (IT)

(*) Notice: Subject to any disclaimer, the term of this patent is extended or adjusted under 35 U.S.C. 154(b) by 369 days.

(21) Appl. No.: 17/908,511

(22) PCT Filed: Mar. 3, 2021

(86) PCT No.: PCT/IB2021/051757
§ 371 (c)(1),
(2) Date: Aug. 31, 2022

(87) PCT Pub. No.: WO2021/181208
PCT Pub. Date: Sep. 16, 2021

(65) Prior Publication Data

US 2023/0120839 A1 Apr. 20, 2023

(30) Foreign Application Priority Data

Mar. 10, 2020 (IT) ........................ 102020000005077

(51) Int. Cl.
*E05D 15/26* (2006.01)
*E06B 3/48* (2006.01)
(Continued)

(52) U.S. Cl.
CPC ............ *E06B 3/482* (2013.01); *E05D 15/264* (2013.01); *E06B 3/5045* (2013.01); *E06B 3/924* (2013.01);
(Continued)

(58) Field of Classification Search
CPC ........ E06B 3/482; E06B 3/5045; E06B 3/924; E05D 15/264; E05D 15/28; A47B 43/00;
(Continued)

(56) References Cited

U.S. PATENT DOCUMENTS 4,348,069 A 9/1982 Lindsay
5,938,306 A 8/1999 Lambright et al.

FOREIGN PATENT DOCUMENTS

JP 2000160921 A 6/2000

OTHER PUBLICATIONS

European Patent Office, International Search Report issued in PCT/IB2021/051757, mailed May 25, 2021, Rijswijk, NL.
(Continued)

*Primary Examiner* — Kimberley S Wright

(74) *Attorney, Agent, or Firm* — Ferguson Case Orr Paterson

(57) ABSTRACT

A container cabinet has a box-like structure and a door connected to the box-like structure by an articulated quadrilateral. The box-like structure has a first side shoulder and a second side shoulder, an upper panel, a lower panel, and a front part. The articulated quadrilateral, supporting and guiding the door from a door closing position to a door maximum opening position, has a crank having a first crank end and a second crank end, and a rocker arm. The crank is hinged with the first crank end to the door and with the second crank end to the upper or lower panel to rotate about a crank vertical rotation axis. The rocker arm is connected, on one side, to the door and, on an opposite side, to the first side shoulder and has a movable side panel having a movable side panel front end and a movable side panel rear end, respectively hinging the movable side panel to the door and to the first side shoulder.

12 Claims, 10 Drawing Sheets

(51) Int. Cl.
*E06B 3/50* (2006.01)
*E06B 3/92* (2006.01)
*A47B 43/00* (2006.01)
*A47B 81/00* (2006.01)
*A47B 97/00* (2006.01)
*E05D 15/28* (2006.01)

(52) U.S. Cl.
CPC ............... *A47B 43/00* (2013.01); *A47B 81/00* (2013.01); *A47B 97/00* (2013.01); *E05D 15/28* (2013.01); *E05Y 2900/20* (2013.01)

(58) Field of Classification Search
CPC ..... A47B 97/00; A47B 81/00; E05Y 2900/20; E05Y 2900/132
See application file for complete search history.

(56) References Cited

OTHER PUBLICATIONS

European Patent Office, Written Opinion issued in PCT/IB2021/051757, mailed May 25, 2021.

CONTAINER CABINET

CROSS-REFERENCE TO RELATED APPLICATIONS

This application is a National Phase Application of PCT International Application No. PCT/IB2021/051757, having an International Filing Date of Mar. 3, 2021 which claims the benefit of priority to Italian Patent Application No. 102020000005077, filed Mar. 10, 2020, each of which is hereby incorporated by reference in its entirety.

FIELD OF THE INVENTION

The present invention relates to a container cabinet provided with a roto-translatable door.

In partiular, the present invention relates to a container cabinet provided with a door movable from a closing position in which the door is arranged on a front part of the container cabinet to an opening position in which the door is arranged on a side wall of the container cabinet.

BACKGROUND ART

In the context of furnishing elements provided with doors roto-translating with respect to a containing box-like structure, a particularly felt need lies in the creation of resistant, highly durable, compact, easy to make and aesthetically elegant door opening and closing mechanisms.

A known solution, the Less piece of furniture, produced by Unifor since 1994, provides for the use of a mechanism with a cam path in which two pins, fixed to a plate for the connection to a door of the container cabinet, are guided. Such a solution allows the door to roto-translate from the closing position of a compartment of the box-like structure of the container cabinet to an opening position in which the door is arranged outside a side wall of the box-like structure of the container cabinet. Thereby, the door in the opening position does not obstruct the space in front of the opening of the compartment and therefore the peripheral space of the container cabinet may be used.

However, on the one hand, such a mechanism may be particularly noisy due to the mechanical interaction of the pins with the walls of the cammed or cam path and, on the other hand, it may incur a misalignment between the upper mechanism and the lower mechanism.

Document JP2000160921 discloses a solution for opening a roto-translating door of an exhibitor, in which two connection levers are provided between a side wall of the container cabinet and the roto-translating door, in which the two levers are in a vertically offset position. Therefore, such a solution is particularly bulky and takes up space inside the compartment, consequently preventing the use thereof as a container.

In this context, the need is therefore felt to create a container cabinet with a roto-translating door in which the door opening mechanism has a smooth and silent opening and closing movement.

Furthermore, the need is felt to create a container cabinet with a roto-translating door in which the opening and closing mechanism is as unbulkv as possible, while maintaining a high mechanical strength.

A further need lies in the construction of a container cabinet provided with an opening and closing mechanism of the roto-translating door which makes the container cabinet elegant from an aesthetic point of view.

A not least felt need is to create, in a simple manner and with a small number of hardware components, to allow a simple construction, a container cabinet in which the door in the maximum opening position does not obstruct the front area and occupies the least possible space in the side area of the cabinet.

SUMMARY OF THE INVENTION

It is an object of the present invention to overcome the drawbacks of the prior art and to provide a solution to the need of providing a container cabinet as defined in the appended claims.

By virtue of a container cabinet as described and claimed herein, it is possible to meet the aforementioned needs, and in particular to obtain a door opening and closing mechanism which is simple to construct and has a small number of components with respect to the prior art.

By virtue of the provision of a movable side panel as an element of the door opening and closing mechanism, in other words as an element of an articulated quadrilateral, it is possible to create a container cabinet which, with a single crank, allows a smooth and synchronized movement of the door, while maintaining a high mechanical resistance and reliability when opening and closing the door.

Some advantageous embodiments are the subject of the dependent claims.

DRAWINGS

Further features and advantages of the assembly according to the invention will become apparent from the description provided below of preferred embodiments thereof, given by way of indicative, non-limiting examples, with reference to the accompanying drawings, in which.

DESCRIPTION OF SOME PREFERRED EMBODIMENTS

Figure 1:
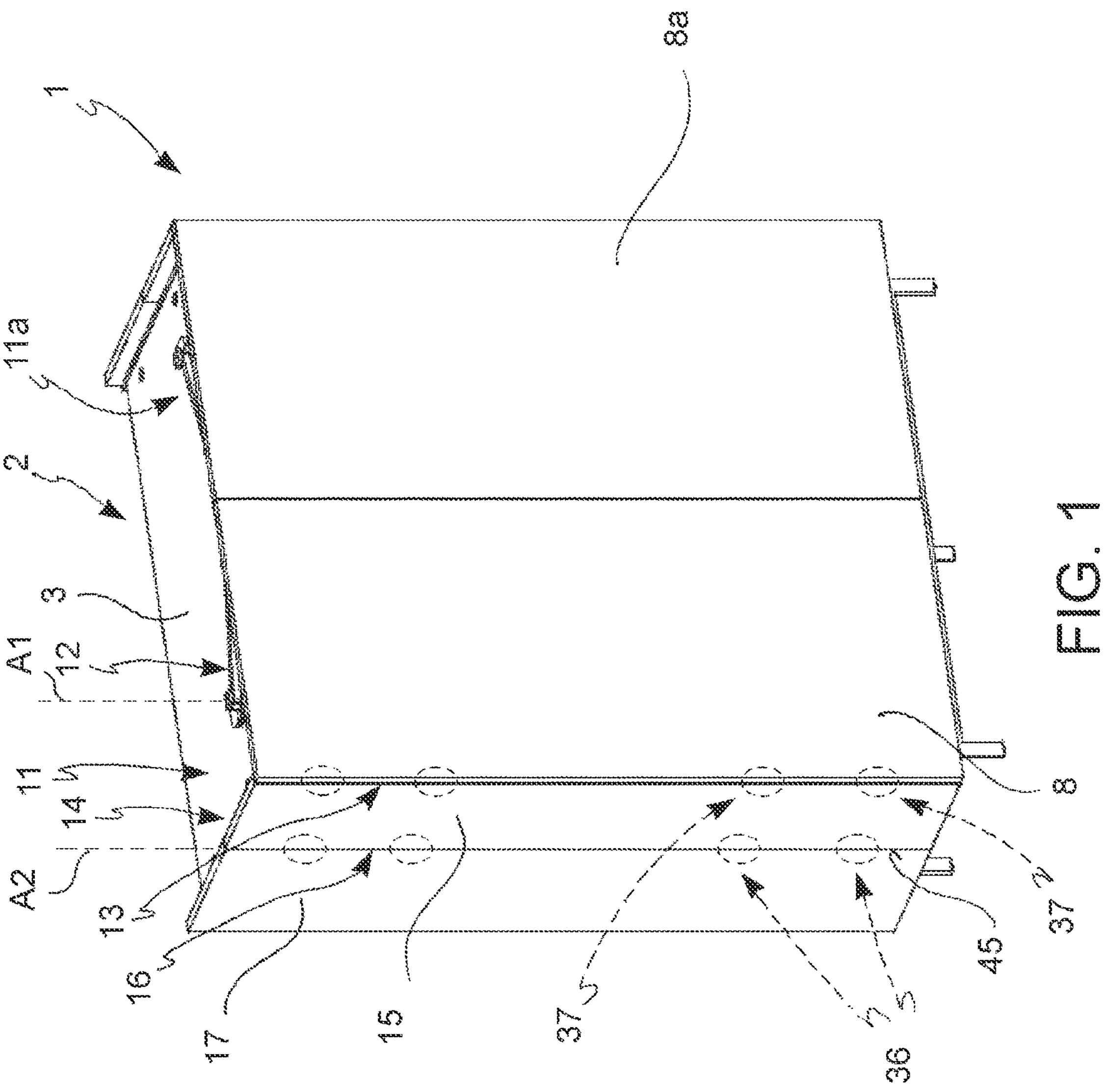
FIG. 1 shows a side axonometric view of a container cabinet according to the present invention with two doors in the closing position, in which the doors are connected to an upper panel of a box-like structure of the container cabinet.
Figure 2:
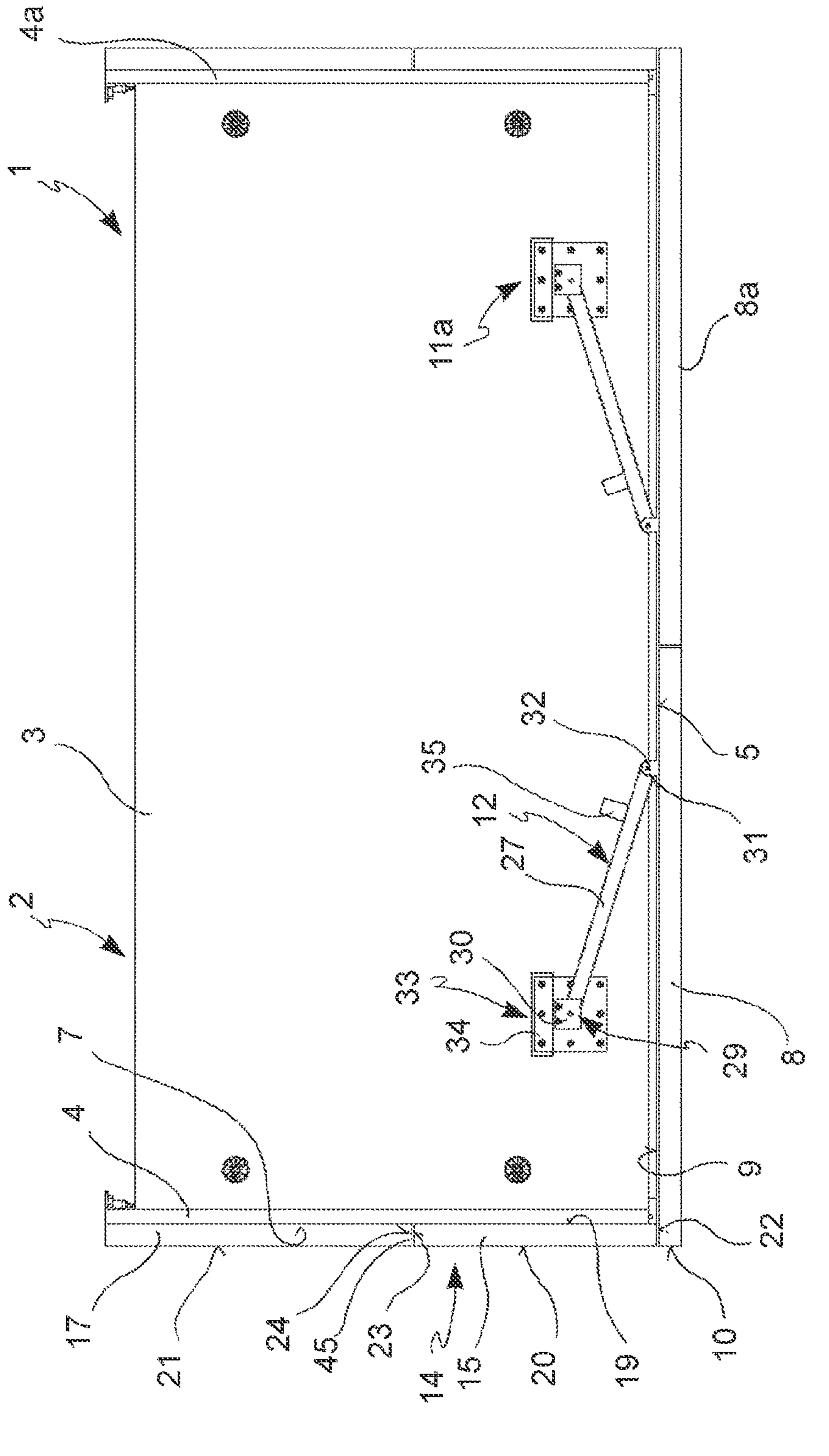
FIG. 2 shows a plan view of the container cabinet in FIG. 1.
Figure 3:
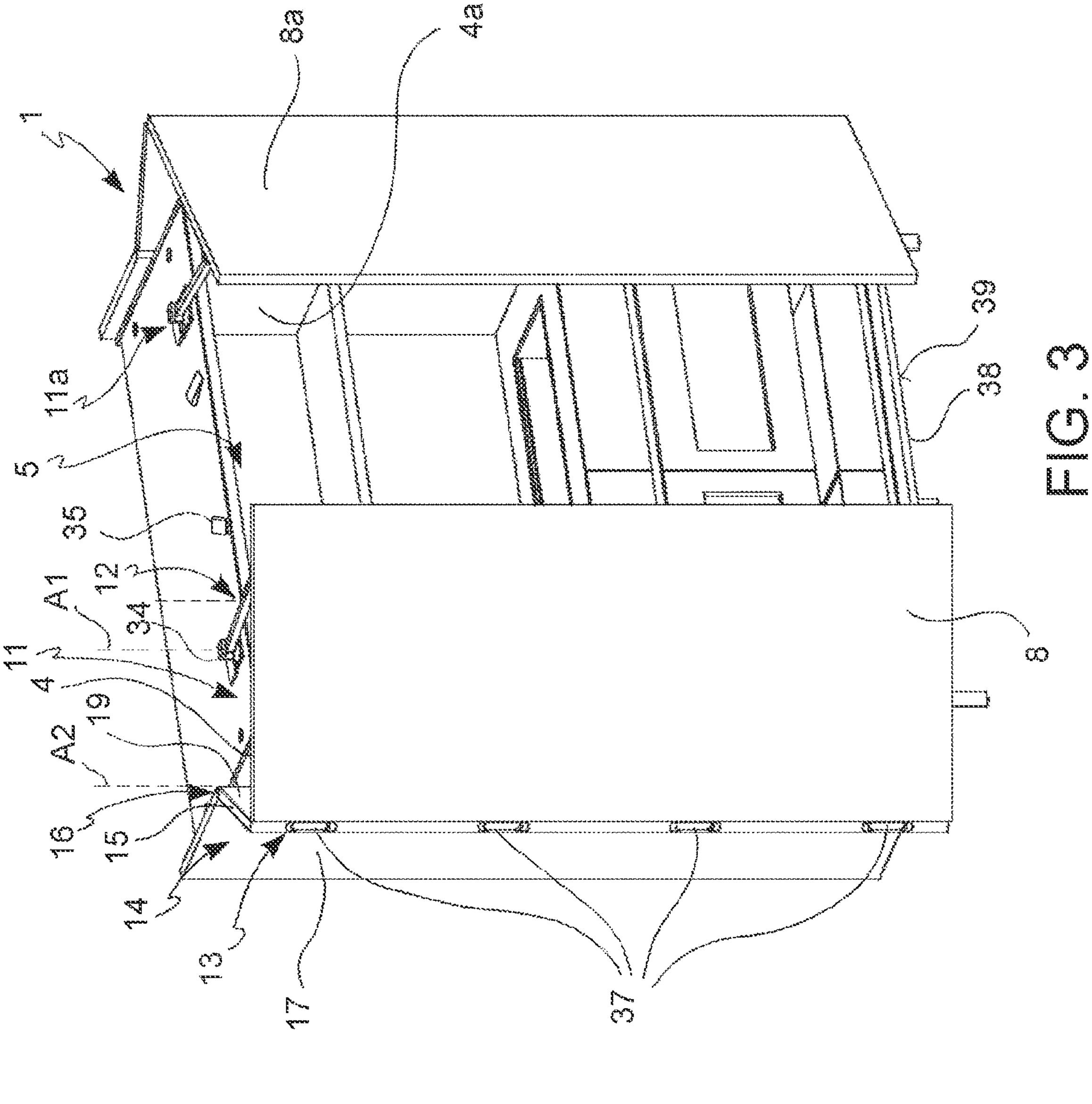
FIG. 3 shows a side axonometric view of the container cabinet in FIG. 1 in which the doors are in an intermediate position between the closing position and the maximum opening position.
Figure 4:
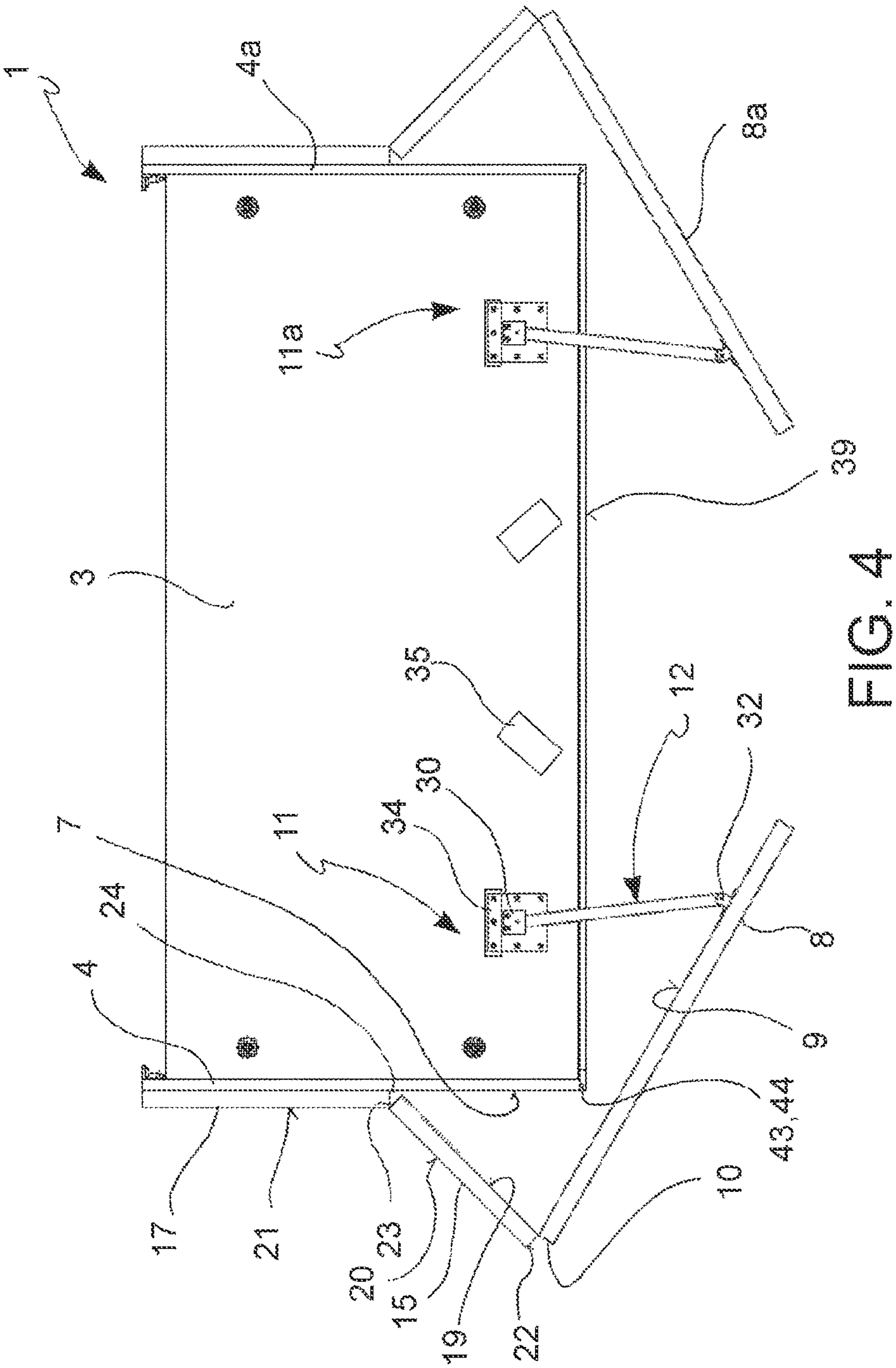
FIG. 4 shows a plan view of the container cabinet in FIG. 3.
Figure 5:
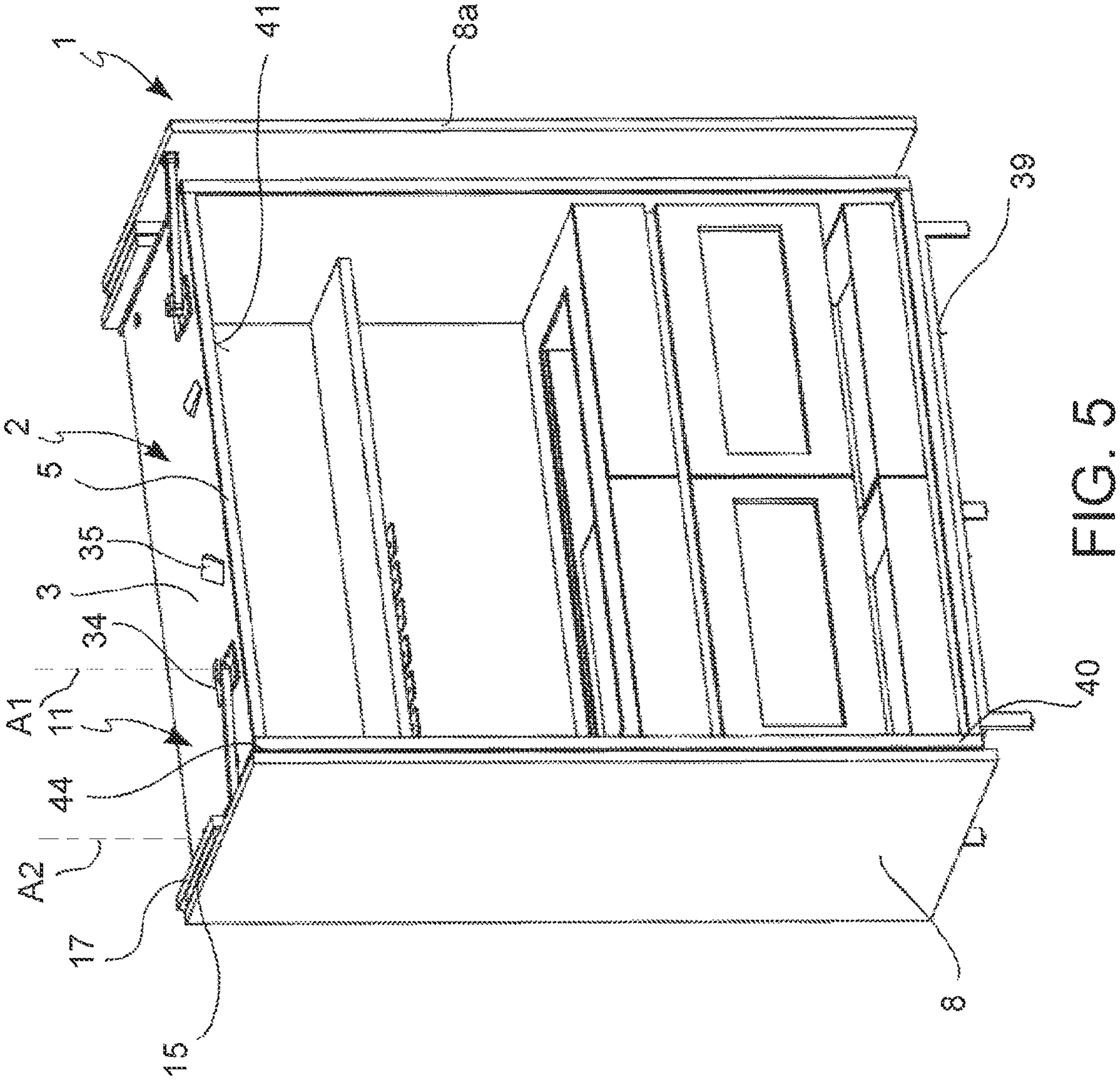
FIG. 5 shows a side axonometric view of the container cabinet in FIG. 1 in which the doors are in the maximum opening position.
Figure 6:
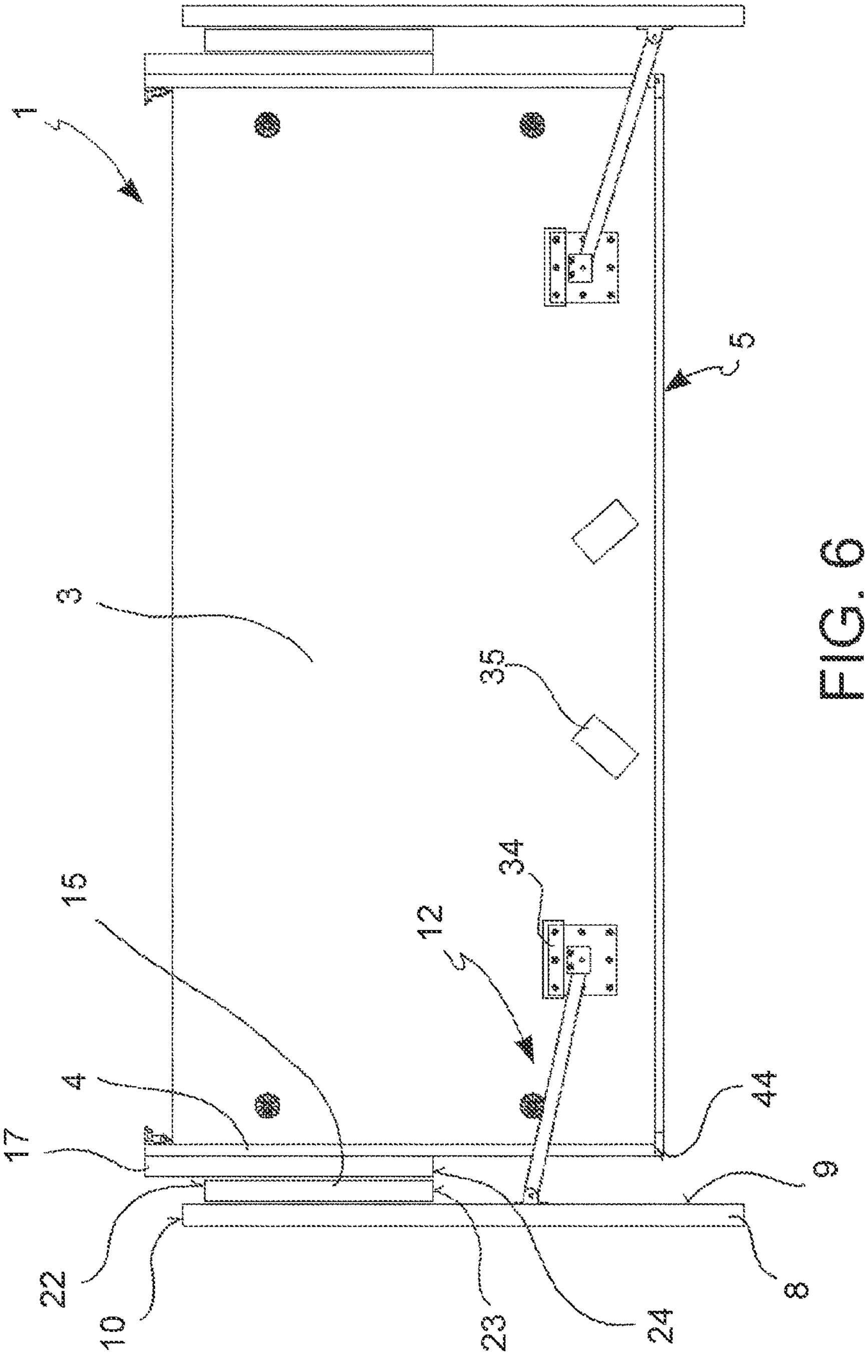
FIG. 6 shows a plan view of the container cabinet in FIG. 5.
Figure 7:
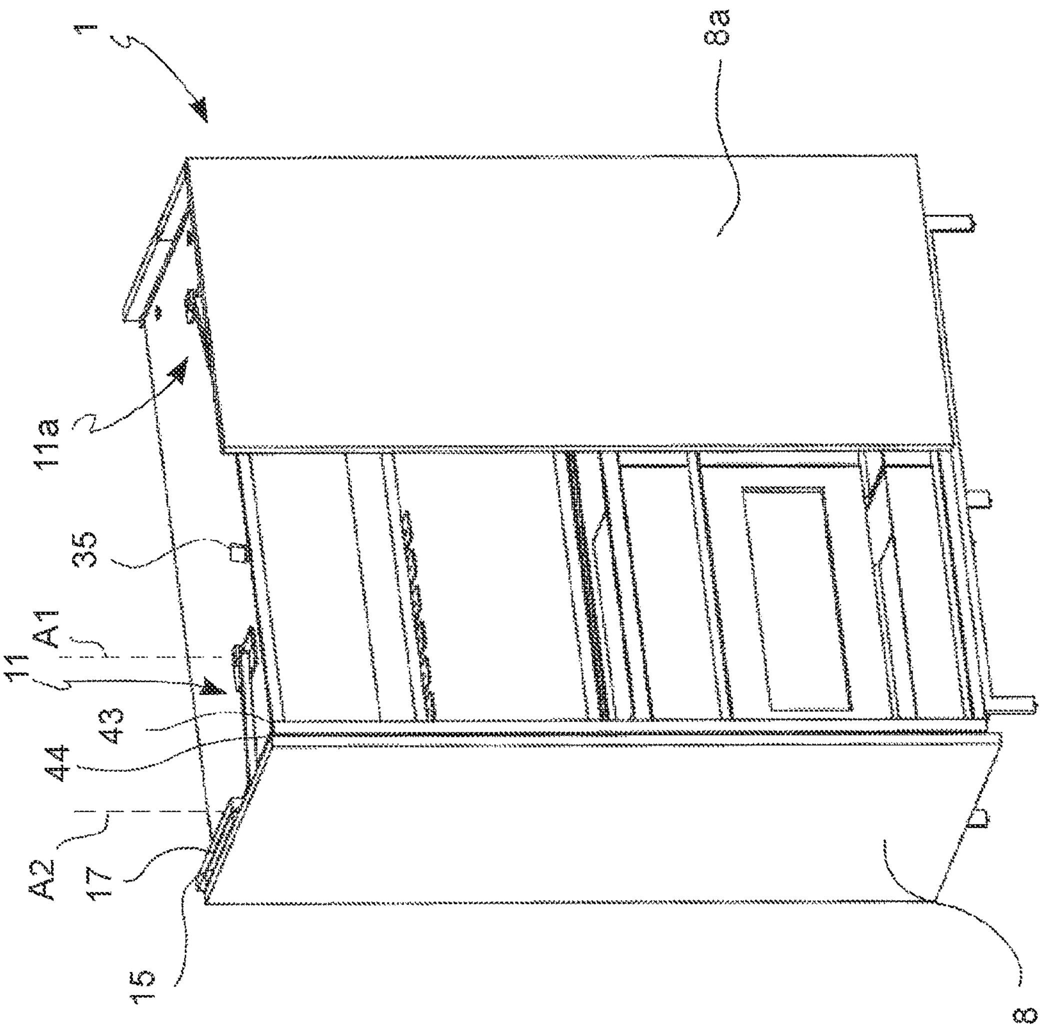
FIG. 7 shows a side axonometric view of the container cabinet in FIG. 1 in which one door is in the maximum opening position and the other door is in the closing position.
Figure 8:
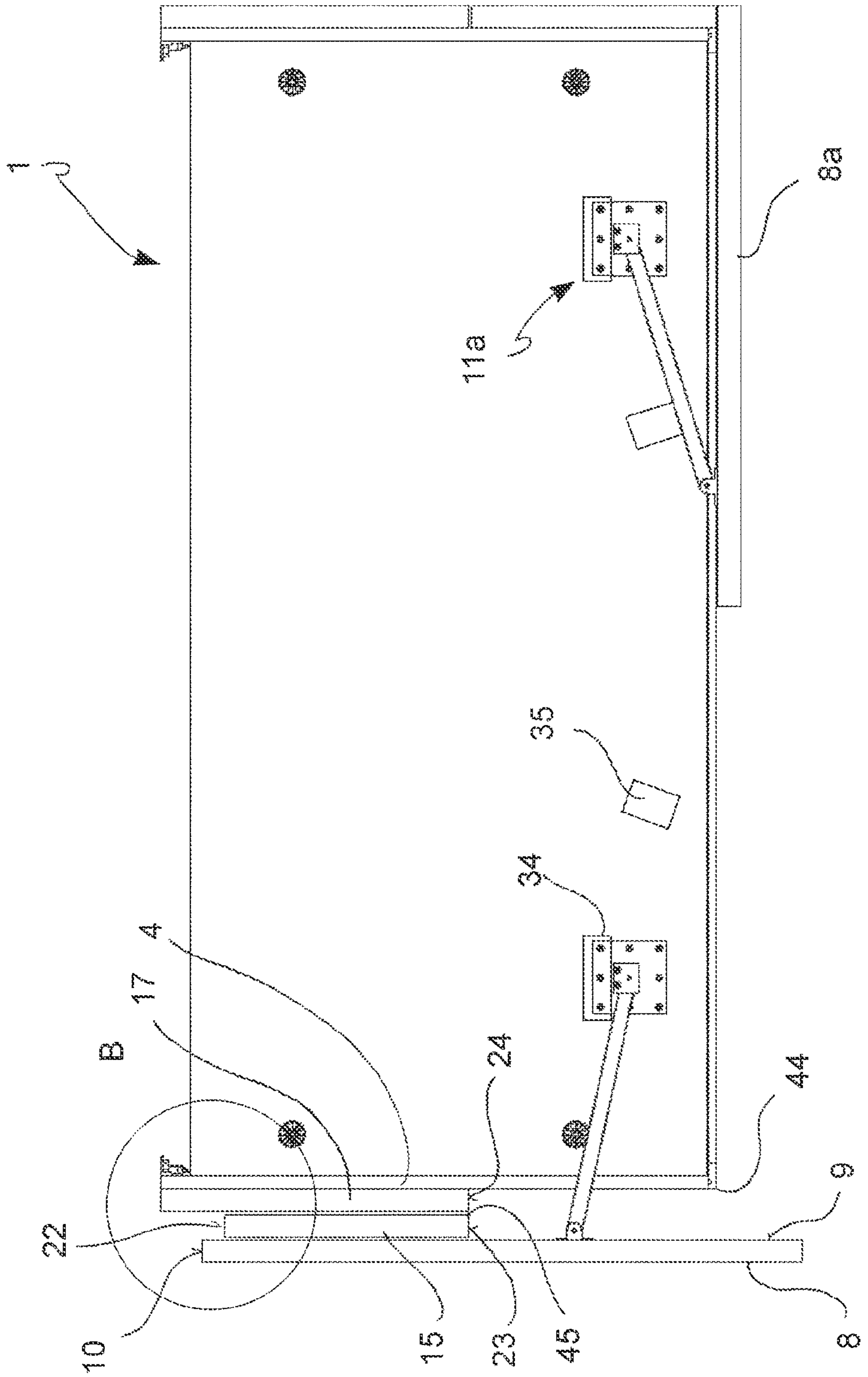
FIG. 8 shows a plan view of the container cabinet in FIG. 7.

In accordance with a general embodiment, a container cabinet is indicated by reference numeral 1.

Said container cabinet 1 comprises a box-like structure 2 and at least one door 8 connected to said box-like structure 2 by means of an articulated quadrilateral 11.

Said box-like structure 2 comprises at least a first side shoulder 4 and a second side shoulder 4*a*, an upper structural panel 3 and a lower panel 38.

Said box-like structure 2 has a front part 5. Said front part 5 frontally delimits said box-like structure 2.

Said articulated quadrilateral 11 is configured to support and guide said door 8 from a door closing position to a door maximum opening position. In said door closing position, said door 8 is arranged in front of said front part 5. In said door maximum opening position, said door 8 is externally arranged directly or indirectly facing said first side shoulder 4.

Said articulated quadrilateral 11 comprises a crank 12 and a rocker arm 14. Said crank 12 comprises a first crank end 29 and a second crank end 31.

Said crank 12 is hinged with said first crank end 29 to said door 6 and with said second crank end 31 to said upper structural panel 3, or to said lower panel 38, so as to rotate about a crank vertical rotation axis A1. Said crank vertical rotation axis A1 is fixed with respect to said box-like structure 2.

Said rocker arm 14 is rotatably connected, or connected in an oscillating manner, on one side, to said door 6 and, on an opposite side, to said first side shoulder 4.

Said rocker arm 14 comprises a movable side panel 15 which has a movable side panel front end 13 and a movable side panel rear end 16. Said movable side panel 15 is hinged with said movable side panel front end 13 to said door 8 and said movable side panel 15 is connected with said movable side panel rear end 16 to said first side shoulder 4 so as to rotate about a rocker arm vertical rotation axis A2 outside said first side shoulder 4.

Within the present disclosure, the terms front, rear, side, upper, and lower refer to the box-like structure 2 and to the usual usage thereof by a user. Likewise, the terms inner and outer refer to the box-like structure 2.

In accordance with an embodiment, said rocker arm vertical rotation axis A2 is fixed with respect to said box-like structure 2.

In accordance with an embodiment, said rocker arm vertical rotation axis A2 is positioned outside said box-iike structure 2, in particular outside said first side shoulder 4.

In accordance with an embodiment, said upper panel 3 comprises an upper panel front side corner 43.

In accordance with an embodiment, said lower panel 38 comprises a lower panel front side corner 46.

In accordance with an embodiment, said first side shoulder 4 comprises a first side shoulder outer side corner 44.

In accordance with an embodiment, said upper panel front side corner 43 and said first side shoulder outer side corner 44 belong to the same plane.

In accordance with an embodiment, said first door 8 from said door closing position to said door maximum opening position, and vice versa, roto-translates about said upper panel front side corner 43 without interfering with said box-like structure 2.

In accordance with an embodiment, said first door 8 from said door closing position to said door maximum opening position, and vice versa, roto-translates about said lower panel front side corner 46 without interfering with said box-like structure 2.

In accordance with an embodiment, said first door 8 from said closing position to said maximum opening position, and vice versa, roto-translates about said first side shoulder outer front corner 44 without interfering with said box-like structure 2.

In accordance with an embodiment, said movable side panel 15 is configured to synchronize in the vertical direction the movement of said door 8 between said door closing position and said door maximum opening position, and vice versa.

In accordance with an embodiment, said movable side panel 15 is hinged with said movable side panel front end 13 to said door 8 in a plurality of hinging points spaced apart in the vertical direction.

In accordance with an embodiment, said movable side panel 15 is connected with said movable side panel rear end 16 to said first side shoulder 4 in a plurality of connection points spaced apart in the vertical direction.

In accordance with an embodiment, said lower panel 38 comprises a lower panel front edge 39. Said first side shoulder 4 comprises a first side shoulder front edge 40. Said upper structural panel 3 comprises an upper structural panel front edge 41.

In accordance with an embodiment, said upper structural panel front edge 41, said lower panel front edge 39 and said first side shoulder front edge 40 are coplanar.

In accordance with an embodiment, said front part 5 comprises said upper structural panel front edge 41, said lower structural panel front edge 39, and said first side shoulder front edge 40.

In accordance with an embodiment, in said closing position, said door 8 abuts against said front part 5.

In accordance with an embodiment, said container cabinet 1 comprises a fixed side panel 17 constrained to said first side shoulder 4, outside it with respect to said box-like structure 2.

In accordance with an embodiment, said fixed side panel 17 comprises a fixed side panel outer side 21 facing in the opposite direction with respect to said box-like structure 2 and a fixed panel front side corner 45.

In accordance with an embodiment, said movable side panel 15 is hinged to said fixed side panel 17 so as to rotate about said front side corner of said fixed side panel 45 to face said fixed side panel outer side 21 in the door maximum opening position.

In accordance with an embodiment, said movable side panel 15, passing from said door closing position to said door maximum opening position, rotates by 180° about said rocker arm vertical rotation axis A2, and said door 8 in said door maximum opening position is arranged at 90° with respect to the position of said door 8 when said door 8 is in the door closing position.

In accordance with an embodiment, said door 4, said side shoulder 4, said movable side panel 15 and said fixed side panel 17 are geometric structures having the shape of a parallelepiped which have a peripheral edge extending between an inner side or inner surface and an outer side or outer surface. In particular, said peripheral edge may comprise side and/or upper, lower, front, and rear portions. Furthermore, the intersection between edges and sides or surfaces define corners of said geometric structures.

In accordance with an embodiment, said door 4, said movable side panel 15, and said side panel and said fixed panel have a peripheral frame on which a thin covering panel is fixed externally and/or internally.

In accordance with an embodiment, said movable side panel 15 and said fixed side panel 17 have the same length in the vertical direction.

In accordance with an embodiment, said door 4 has a length in the vertical direction which is not shorter than the length of said movable side panel 15.

In accordance with an embodiment, said door 8 comprises at least one door side edge 10 opposite to another door side edge.

In accordance with an embodiment, said movable side panel 15 is hinged to said door 8 close to said door side edge 10.

In accordance with an embodiment, said door 8 comprises a door inner side 9.

In accordance with an embodiment, said movable side panel 15 is hinged to said first door 8 on said first door inner side 9.

In accordance with an embodiment, said first side shoulder 4 comprises a first side shoulder outer side 7 and a side shoulder front edge 40.

In accordance with an embodiment, said movable side panel 15 has a movable side panel inner side 19 and a movable side panel outer side 20 facing in opposite directions.

In accordance with an embodiment, in said door closing position, said movable side panel inner side 19 is oriented in the direction of said box-like structure 2 and in said door maximum opening position, said movable side panel outer side 20 faces said first side shoulder outer side 7.

In accordance with an embodiment, in said door closing position, said movable side panel inner side 19 faces said first side shoulder outer side 7 and in said door maximum opening posjton said movable side panel outer side 20 is oriented in the direction of said first side shoulder outer side 7 at a minimum distance D3 from said first side shoulder outer side 7.

In accordance with an embodiment, said minimum distance D3 is not less than 5 mm.

In accordance with an embodiment, in said door closing position said movable side panel inner side 19 faces said first side shoulder outer side 7 and said door 8 is arranged in said front part 5 of said box-like structure 2.

In accordance with an embodiment, in said door maximum opening position said movable side panel outer side 20 faces said fixed side panel outer side 21 at a minimum distance D1 from said fixed side panel outer side 21.

In accordance with an embodiment, said minimum distance D1 is not less than 5 mm.

In accordance with an embodiment, in said door maximum opening position, said door 8 is arranged parallel to said frst side shoulder 4 at a distance from said first side shoulder 4 greater than the sum of the thickness of sad, fixed side panel 17 and of the thickness of said movable side panel 15.

In accordance with an embodiment, in said maximum opening position said door inner side 9 faces at least said movable side panel inner side 19 at a minimum distance D2 from said movable side panel inner side 19. Such a minimum distance D2 is not less than 5 mm.

In accordance with an embodiment, said movable side panel front end 13 comprises a movable side panel front edge 22 and said movable side panel rear end 16 comprises a movable side panel rear edge 23.

In accordance with an embodiment, said fixed side panel 17 iAn comprises a fixed side panel front edge 24.

In accordance with an embodiment, in said closing position said fixed side panel front edge 24 faces said movable side panel rear edge 23, and said movable side panel front edge 22 faces said door inner side 9.

In accordance with an embodiment, in said opening position said fixed side panel front edge 24 and said movable side panel rear edge 23 face towards the same direction, and said door side edge 10 and said movable side panel front edge 22 face towards the same direction.

In accordance with an embodiment, in said closing position said movable side panel 15 is arranged flush with said fixed side panel 17 and said door side edge 10 is flush with said movable side panel 15.

In accordance with an embodiment, in said opening position said door 8, said movable side panel 15 and said fixed side panel 17 are packed one on the other and arranged each parallel to the other, parallel to said first side shoulder 4 outside said first side shoulder 4.

In accordance with an embodiment, in said door closing position said fixed side panel outer side 21, said movable side panel outer side 20 and said door side edge 10 are coplanar.

In accordance with an embodiment, said movable side panel 15 is hinged to said fixed side panel 17 by means of a first plurality of concealed hinges 36 and is hinged to said door 8 by means of a second plurality of concealed hinges 37.

In accordance with an embodiment, each hinge of said first plurality of concealed hinges 36 is recessed and arranged on said fixed side panel front edge 24 and on said movable side panel rear edge 23.

In accordance with an embodiment, said first plurality of concealed hinges 36 are configured to allow a rotation of 180 degrees between said movable side panel 15 and said fixed side panel 17.

In accordance with an embodiment, in said maximum opening position, said first plurality of concealed hinges 36 is configured to maintain a minimum distance D1 between said movable side panel outer side 20 and said fixed side panel outer side 21.

In accordance with an embodiment, such a minimum distance D1 is not less than 5 millimeters.

In accordance with an embodiment, in said closing position, said first plurality of concealed hinges 36 is configured to substantially place in abutment said fixed side panel front edge 24 and said movable side panel rear edge 23.

In accordance with an embodiment, each hinge of said second plurality of concealed hinges 37 is recessed and arranged on said movable side panel front edge 22 and on said door inner side 9.

In accordance with an embodiment, said second plurality of concealed hinges 37 is configured to allow a rotation of 90 degrees between said movable side panel 15 and said door 8.

In accordance with an embodiment, in said maximum opening position, said second plurality of concealed hinges 37 is configured to maintain a minimum distance D2 between said door inner side 9 and said movable side panel inner side 19.

In accordance with an embodiment, such a minimum distance D2 is not less than 5 millimeters.

In accordance with an embodiment, in said closing position, said first plurality of concealed hinges 36 are configured to substantially place in abutment said movable side panel front edge 22 and said door inner side 9.

The term concealed hinge means that type of hinge which comprises a first part of hinge and a second part of hinge embedded inside suitable housing seats made on two components of a container cabinet configured to be movable with respect to each other.

In accordance with an embodiment, said crank 12 is indirectly connected to said rocker arm 14 only by means of said first door 8.

In accordance with an embodiment, said crank 12 has a crank arm defined by the distance between said first crank end 29 and said second crank end 31.

In accordance with an embodiment, said movable side panel 15 has a rocker arm defined by the distance between the movable side panel connection points between said door 8 and said box-like structure 2.

In accordance with an embodiment, said rocker arm is defined by the distance between said first plurality of concealed hinges and said second plurality of concealed hinges.

In accordance with an embodiment, said rocker arm is defined by the distance between said movable side panel front edge 22 and said movable side panel rear edge 23.

In accordance with an embodiment, said crank arm has a length not shorter than the length of said rocker arm.

In accordance with an embodiment, said crank arm as configured to rotate about said crank fixed vertical axis by a predefined crank rotation angle.

In accordance with an embodiment, said rocker arm is configured to rotate about said rocker arm fixed vertical axis by a predefined angle equal to 180 degrees.

In accordance with an embodiment, said predefined crank rotation angle is that angle which allows said movable side panel to rotate by 180 degrees with respect to said rocker arm vertical rotation axis A2.

In accordance with an embodiment, the distance between said crank vertical rotation axis A1 and said front part 5 is less than the distance between said rocker arm vertical rotation axis A2 and said front part 5.

In accordance with an embodiment, said door 8 comprises a door arm defined by the distance between said second crank end 31 hinged to said door 8 and said movable side panel front end 13 hinged to said door 8.

In accordance with an embodiment, said door arm is not less than the distance between said first crank end 29 and said second crank end 31.

In accordance with an embodiment, the distance between said first crank end 29 and said second crank end 31 is less than the distance between said crank vertical rotation axis A1 and said rocker arm vertical rotation axis A2.

In accordance with an embodiment, said door 8, said movable side panel 15 and said fixed side panel 17 form a foldable outer panel connected to said box-like structure 2. In said closing posjton, said foldable outer panel has an L-shaped configuration in which said door 8 is arranged on said front part 5 of the box-iike structure 2, and said movable side panel 15 and said fixed side panel are arranged on said first side shoulder 4 of the box-shaped structure 2. In said maximum opening position, instead, said outer panel has a folded configuration outside the firsit side shoulder 4 of the box-like structure 2 in which said movable side panel 15 is rotated by 180° with respect to said fixed side panel 17 and said door 8 is rotated by 90° with respect to said movable side panel 15.

Figure 9:
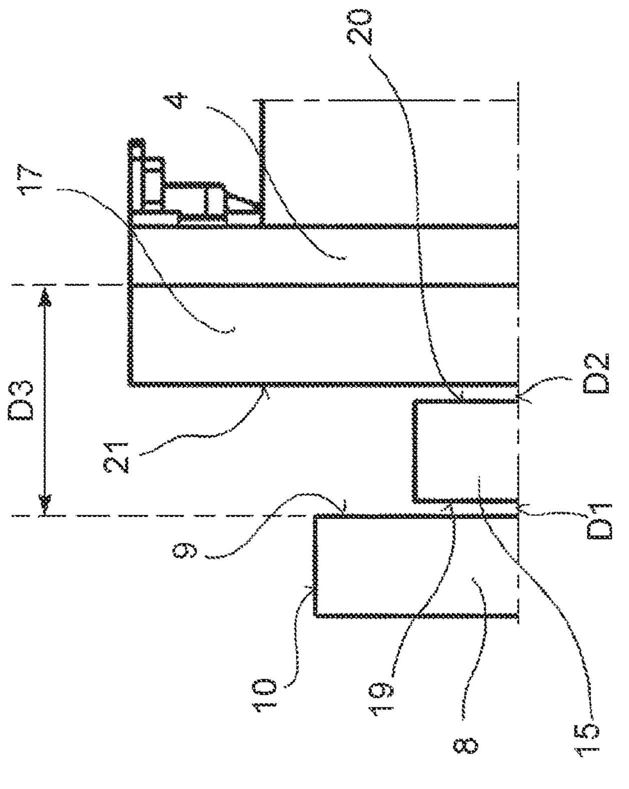
FIG. 9 shows a detail of FIG. 8.
Figure 10:
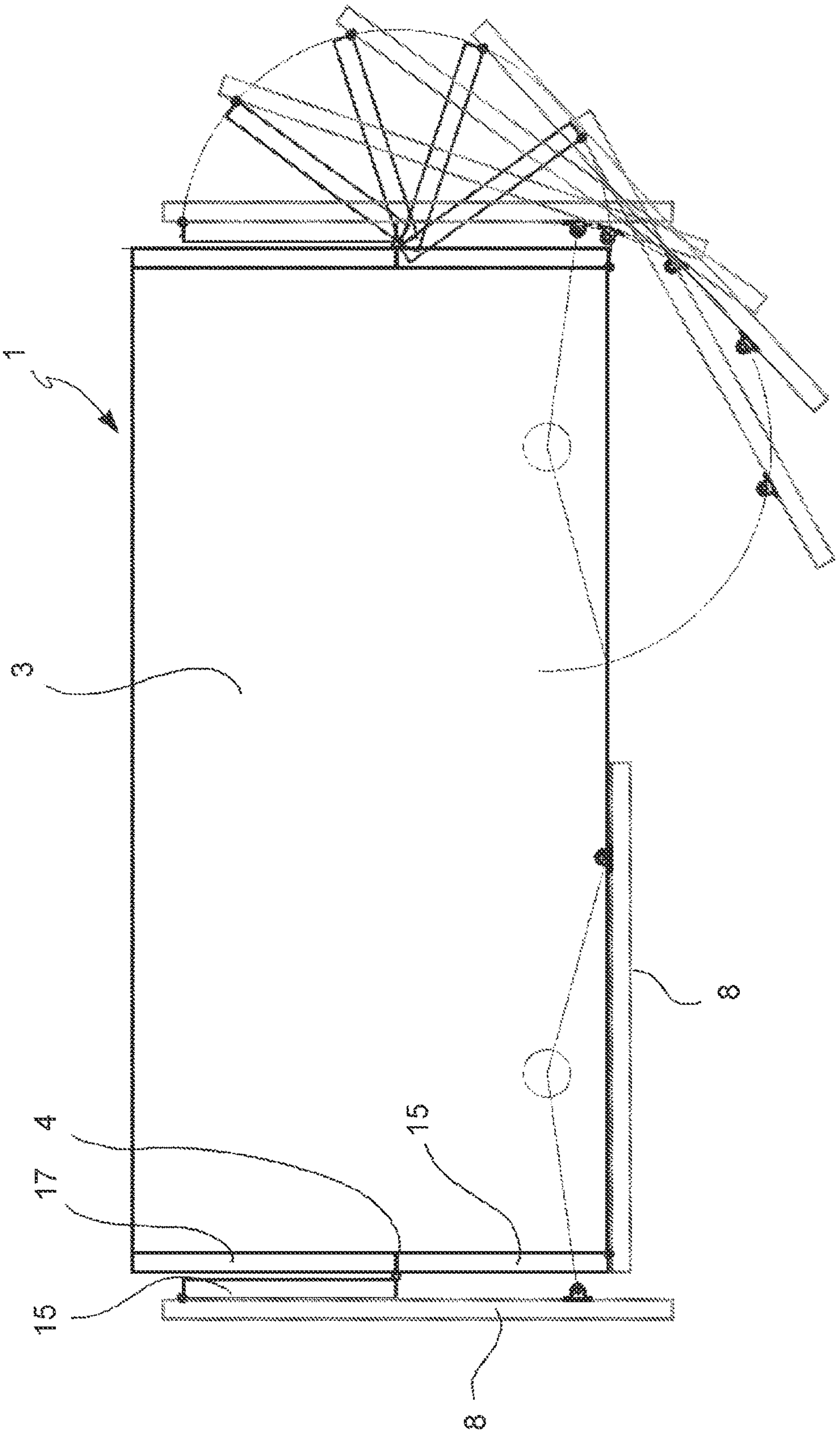
FIG. 10 shows a diagrammatic plan view of a plurality of different positions of the door and of the synchronizing member between the maximum opening position and the closing position

As shown in FIG. 9, during the opening of said door 8, the maximum bulk of the door 8 in the side area of the container cabinet 1 depends on the length of the rocker arm, while the maximum bulk of the door 8 in the front area of the container cabinet 1 depends on the length of the crank arm and on the distance between the crank vertical rotation axis A1 with respect to the front part 5 of the box-like structure 2 and the rocker arm vertical rotation axis A2.

Depending on the length of said crank arm and on the position of the crank vertical rotation axis A1 with respect to the front part 5 and to the position of the rocker arm vertical rotation axis A2, on the length of said rocker arm and on the length of said door arm with respect to the extension of said door 8 between the side edges thereof, it is possible to determine the relative position of said door 8 with respect to said front part 5 in said maximum opening position. In other words, it is possible to determine whether in said maximum opening position, said door 8 protrudes or not with respect to said front part 5 of the box-like structure 2.

Therefore, by varying the positions with respect to the box-like structure 2 of the crank vertical rotation axis A1 and of the rocker arm vertical rotation axis A2, the crank arm, the rocker arm, and the door arm, it is possible to create container cabinets with different door opening and closing movement trajectories.

In accordance with an embodiment, said crank 12 is a rod 27 extending along a longitudinal rod direction between said first crank end 29 and said second crank end 31, in which said first crank end 29 is rotatable about a crank pin 30 corresponding to said crank vertical rotation axis A1, and in which said second crank end 31 is hinged to said door 8 in a manner rotatable with respect to a door pin 32.

In accordance with an emboddment, said rod is a metal rod.

In accordance with an embodiment, said rod development direction comprises at least one rectilinear direction.

In accordance with an embodiment, said rod development direction is rectilinear.

In accordance with an embodiment, said rod development direction has at least one curvilinear direction.

In accordance with an embodiment, said rod 27 has at least one U-shaped portion close to said second crank end 31.

In accordance with an embodiment, said container cabinet comprises crank stopper means 33 configured to limit a rotation of said crank 12 between a first predefined crank position and a second predefined crank position corresponding to said door closing position and said door maximum opening position, respectively.

In accordance with an embodiment, said crank stopper means 33 comprise a stopper plate 34 against which said rod 27 abuts when said door 8 is in the closing position.

In accordance with an embodiment, said stopper plate 34 is positioned close to said crank pin 30 and extends about said crank pin 30 so as to hinder a rotation of said rod 27.

In accordance with an embodiment, said crank stopper means 33 comprise a stopper wedge 35 configured to interfere between said rod 27 and said upper wall 3 when said door 8 is in said closing position.

In accordance with an embodiment, said crank stopper means 33 comprise a stopper wedge 35 configured to interfere between said rod 27 and said upper wall 3 when said door 8 is in said maximum opening position.

In accordance with an embodiment, said stopper wedge 35 is fixed to said upper wall 3 and has an inclined slide of the stopper wedge 35 against which said rod 27 abuts until it stops.

In accordance with an embodiment, said stopper wedge 35 is made of elastic material. Thereby, said stopper wedge 35 also acts as a damping element and clamping element for said door 8.

In accordance with an embodiment, said crank pin 30 is constrained on said lower panel 38 by means of a support bracket. As shown, for example, in FIGS. 11 and 12, said support bracket is connected to said lower panel 38 and is arranged outside said box-like structure 2 below said lower panel 38. Said container cabinet 1 comprises said support bracket.

In accordance with an embodiment, as shown, for example, in FIGS. 11 and 12, said support bracket has at least a first support plate and a second support plate spaced apart in the vertical direction, and said crank pin 30 is arranged between said first support plate and said second support plate.

In accordance with an embodiment, said crank 12 rotates about said crank pin 30 with said first crank end 29, and said support bracket comprises said crank stopper means 33.

In accordance with an embodiment, said container cabinet comprises a support frame fixed at least to said lower panel 38.

In accordance with an embodiment, said support frame comprises said support bracket.

In accordance with an embodiment, said support frame is load-bearing.

In accordance with an embodiment, said container cabinet 1 comprises at least two support feet connected to said lower panel 38. In accordance with an embodiment, said support frame comprses said support feet.

In accordance with an embodiment, said container cabinet 1 comprises only one door 8, not shown in the Figures.

In accordance with an embodiment, as shown in the Figures, said container cabinet 1 comprises a second door **8*a* similar to said first door 8 and a second articulated quadrilateral lia similar to and mirroring said first articulated quadrilateral 11**.

In accordance with an embodiment, when said door 8 and said second door **8*a* are in said door closing position, said second door 8*a* is flush with said first door 8**.

In accordance with an embodiment, when said door 8 and said second door **8*a* are in said door closing position, the outer side of the door 8 and the outer side of the second door 8*a*** are coplanar.

In accordance with an embodiment, said container cabinet 1 is a piece of furniture for home furnishing.

In accordance with an embodiment, said container cabinet 1 is a bar cabinet.

The container cabinet 1 according to the present invention, allows the door 8 to be moved from the closing position to the opening position with a single crank 12 to support and guide such a movement. Therefore, in the lower part of the front part 5 of the container cabinet 1 there are no obstructions due to connection elements between the box-like structure and the door.

The container cabinet 1 according to the present invention meets, in a simple and original manner, the need to use the front space of the cabinet 1 with a simple articulated quadrilateral opening mechanism in which one of the members of the articulated quadrilateral 11 is a movable side panel 15 which may act as a finishing and covering panel for the first side shoulder 4, which may be finished, for example, with high quality surface finishes, responding to the need to create a container cabinet 1 which is functional and elegant from an aesthetic point of view.

The articulated quadrilateral 11 comprises, as quadrilateral members, the door 8, the movable side panel 15, and the crank 12, in which only the crank 12 is a hardware element. Therefore, in the context of furniture production, the constructional simplicity and aesthetic elegance of the container cabinet 1 according to the present invention is apparent.

LIST OF REFERENCE NUMERALS

1 Container cabinet
2 box-like structure
3 upper structural panel
4 first side shoulder
**4*a*** second side shoulder
5 front part
7 first side shoulder outer side
8 door
**8*a*** second door
9 door inner side
10 door side edge
11 articulated quadrilateral
**11*a*** second articulated quadrilateral
12 crank
13 movable side panel front end
14 rocker arm
15 movable side panel
16 movable side panel rear end
17 fixed side panel
19 movable side panel inner side
20 movable side panel outer side
21 fixed side panel outer side
22 movable side panel front edge
23 movable side panel rear edge
24 fixed side panel front edge
27 rod
29 first crank end
30 crank pin
31 second crank end
32 door pin
33 crank stopper means
34 stopper plate
35 stopper wedge
36 first plurality of concealed hinges
37 second plurality of concealed hinges
38 lower panel
39 lower panel front edge
40 first side shoulder front edge
41 upper structural panel front edge
43 upper panel front side corner
44 first side shoulder outer side corner
45 fixed panel front side corner
46 lower panel front side corner
A1 crank vertical rotation axis
A2 rocker arm vertical rotation axis

The invention claimed is:

1. A container cabinet comprising a box-like structure and at least one door connected to said box-like structure by an articulated quadrilateral, wherein said box-like structure comprises a first side shoulder and a second side shoulder, an upper structural panel and a lower panel, wherein said box-like structure comprises a front part, wherein said articulated quadrilateral is configured to support and guide said at least one door from a door closing position to a door maximum opening position, wherein in said door closing position said at least one door is arranged in front of said front part, wherein in said door maximum opening position said at least one door is arranged externally facing, directly or indirectly, said first side shoulder, wherein said articulated quadrilateral comprises a crank and a rocker arm, wherein said crank comprises a first crank end and a second crank end, wherein said crank is hinged with said first crank end to said at least one door and with said second crank end to said upper structural panel or to said lower panel so as to rotate about a crank vertical rotation axis (A1), wherein said crank vertical rotation axis (A1) is fixed with respect to said box-like structure, wherein said rocker arm is rotatably connected, on one side, to said at least one door and, on an opposite side, to said first side shoulder, wherein said rocker arm comprises a movable side panel comprising a movable side panel front end and a movable side panel rear end, wherein said movable side panel is hinged with said movable side panel front end to said at least one door and wherein said movable side panel is connected with said movable side panel rear end to said first side shoulder so as to rotate about a rocker arm vertical rotation axis (A2) outside said first side shoulder;

wherein said first side shoulder comprises a first side shoulder outer side and a first side shoulder front edge, wherein said movable side panel comprises a movable side panel inner side, and a movable side panel outer side facing in opposite directions;

wherein, in said door closing position, said movable side panel inner side faces said first side shoulder outer side and said door is arranged in said front part of said box-like structure; and wherein said container cabinet comprises a fixed side panel externally constrained to said first side shoulder with respect to said box-like structure, wherein said fixed side panel comprises a fixed side panel outer side facing in an opposite direction with respect to said box-like structure and a fixed panel front side corner, wherein said movable side panel is hinged to said fixed side panel so as to rotate about said fixed panel front side corner to face said fixed side panel outer side in the door maximum opening position.

2. The container cabinet of claim 1, wherein said upper structural panel comprises an upper panel front side corner, wherein said at least one door from said door closing position to said door maximum opening position, and vice versa, roto-translates about said upper panel front side corner without interfering with said box-like structure, and wherein at least one of the following features applies:

said lower panel comprises a lower panel front side corner, wherein said at least one door from said door closing position to said door maximum opening position, and vice versa, roto-translates about said lower panel front side corner without interfering with said box-like structure, said first side shoulder comprises a first side shoulder outer side corner, wherein said at least one door from said door closing position to said door maximum opening position, and vice versa, roto-translates about said first side shoulder outer side corner without interfering with said box-like structure, said movable side panel is configured to synchronize, in a vertical direction, a movement of said at least one door between said door closing position and said door maximum opening position, and vice versa, said movable side panel is hinged with said movable side panel front end to said at least one door in a plurality of hinging points spaced apart in the vertical direction and wherein said movable side panel is connected with said movable side panel rear end to said first side shoulder in a plurality of connection points spaced apart in the vertical direction.

3. The container cabinet of claim 1, wherein said movable side panel, passing from said door closing position to said door maximum opening position, rotates by 180° about said rocker arm vertical rotation axis (A2), and wherein said at least one door in said door maximum opening position is arranged at 90° with respect to said at least one door when said at least one door is in the door closing position.

4. The container cabinet of claim 3, wherein said at least one door comprises at least one door side edge, wherein said movable side panel is hinged to said at least one door near said at least one door side edge, and wherein said at least one door comprises a door inner side, and said movable side panel is hinged to said at least one door on said door inner side.

5. The container cabinet of claim 4, wherein in said door closing position said movable side panel inner side faces said first side shoulder outer side and in said door maximum opening position said movable side panel outer side is oriented in direction of said first side shoulder outer side at a minimum distance from said first side shoulder outer side, and wherein at least one of the following features applies:

in said door closing position said movable side panel inner side faces said first side shoulder outer side and said door is arranged in said front part of said box-like structure, and in said door maximum opening position, said movable side panel outer side faces said fixed side panel outer side, and said at least one door is arranged parallel to said first side shoulder at a distance from said first side shoulder greater than a sum of a thickness of said fixed side panel and of a thickness of said movable side panel;

said movable side panel front end comprises a movable side panel front edge and said movable side panel rear end comprises a movable side panel rear edge, said fixed side panel comprises a fixed side panel front edge, and said at least one door comprises said door inner side and said at least one door side edge, wherein in said door closing position said fixed side panel front edge faces said movable side panel rear edge, and said movable side panel front edge faces said door inner side, and in said door maximum opening position said fixed side panel front edge and said movable side panel rear edge face towards a same direction, and said at least one door side edge and said movable side panel front edge face towards the same direction; and wherein at least one of the following further features applies:

in said door closing position said movable side panel is arranged flush with said fixed side panel and said at least one door side edge is flush with said movable side panel, and in said door maximum opening position said at least one door, said movable side panel and said fixed side panel are packed one on the other and arranged each parallel to the other, parallel to said first side shoulder outside of said first side shoulder;

in said door closing position said fixed side panel outer side, said movable side panel outer side and said at least one door side edge are coplanar;

said movable side panel is hinged to said fixed side panel by a first plurality of concealed hinges and hinged to said at least one door by a second plurality of concealed hinges, said first plurality of concealed hinges being arranged on said fixed side panel front edge and on said movable side panel rear edge, said second plurality of concealed hinges being arranged on said movable side panel front edge and on said door inner side.

6. The container cabinet of claim 1, wherein said crank is indirectly connected to said rocker arm only by said at least one door, and wherein at least one of the following features applies:

said crank comprises a crank arm defined by a distance between said first crank end and said second crank end, and wherein said movable side panel comprises a rocker arm defined by the distance between movable side panel points of connection between said at least one door and said box-like structure, wherein said crank arm has a length not less than the length of said rocker arm, the distance between said crank vertical rotation axis (A1) and said front part is less than the distance between said rocker arm vertical rotation axis (A2) and said front part, said at least one door comprises a door arm defined by the distance between said second crank end hinged to said at least one door and said movable side panel front end hinged to said at least one door, wherein said door arm is not less than the distance between said first crank end and said second crank end, the distance between said first crank end and said second crank end is less than the distance between said crank vertical rotation axis (A1) and said rocker arm vertical rotation axis (A2).

7. The container cabinet of claim 1, wherein said crank is a rod developing along a rod longitudinal direction between said first crank end and said second crank end, wherein said first crank end is rotatable about a crank pin corresponding to said crank vertical rotation axis (A1), and wherein said second crank end is hinged to said at least one door in a manner rotatable with respect to a door pin.

8. The container cabinet of claim 7, wherein said container cabinet comprises crank stopper means configured to limit a rotation of said crank between a first predefined crank position and a second predefined crank position corresponding to said door closing position and said door maximum opening position, respectively.

9. The container cabinet of claim 8, wherein said crank stopper means comprise a stopper plate against which said rod abuts when said at least one door is in the door maximum opening position, and a stopper wedge configured to interfere with said rod by interposition between said rod and said upper structural panel when said at least one door is in said door closing position.

10. The container cabinet of claim 1, wherein said container cabinet comprises a second door similar to said at least one door and a second articulated quadrilateral similar to, and mirroring said articulated quadrilateral, wherein when said at least one door and said second door are in said door closing position, said second door is flush with said at least one door.

11. The container cabinet of claim 1, wherein said container cabinet is a bar cabinet.

12. A container cabinet comprising a box-like structure and at least one door connected to said box-like structure by an articulated quadrilateral, wherein said box-like structure comprises a first side shoulder and a second side shoulder, an upper structural panel and a lower panel, wherein said box-like structure comprises a front part, wherein said articulated quadrilateral is configured to support and guide said at least one door from a door closing position to a door maximum opening position, wherein in said door closing position said at least one door is arranged in front of said front part, wherein in said door maximum opening position said at least one door is arranged externally facing, directly or indirectly, said first side shoulder, wherein said articulated quadrilateral comprises a crank and a rocker arm, wherein said crank comprises a first crank end and a second crank end, wherein said crank is hinged with said first crank end to said at least one door and with said second crank end to said upper structural panel or to said lower panel so as to rotate about a crank vertical rotation axis (A1), wherein said crank vertical rotation axis (A1) is fixed with respect to said box-like structure, wherein said rocker arm is rotatably connected, on one side, to said at least one door and, on an opposite side, to said first side shoulder, wherein said rocker arm comprises a movable side panel comprising a movable side panel front end and a movable side panel rear end, wherein said movable side panel is hinged with said movable side panel front end to said at least one door and wherein said movable side panel is connected with said movable side panel rear end to said first side shoulder so as to rotate about a rocker arm vertical rotation axis (A2) outside said first side shoulder, wherein said crank is a rod developing along a rod longitudinal direction between said first crank end and said second crank end, wherein said first crank end is rotatable about a crank pin corresponding to said crank vertical rotation axis (A1), and wherein said second crank end is hinged to said at least one door in a manner rotatable with respect to a door pin;

wherein said container cabinet comprises crank stopper means configured to limit a rotation of said crank between a first predefined crank position and a second predefined crank position corresponding to said door closing position and said door maximum opening position, respectively; and wherein said crank stopper means comprise a stopper plate against which said rod abuts when said at least one door is in the door maximum opening position, and a stopper wedge configured to interfere with said rod by interposition between said rod and said upper structural panel when said at least one door is in said door closing position.

* * * * *